United States Patent [19]

Timm et al.

[11] Patent Number: 4,689,148

[45] Date of Patent: Aug. 25, 1987

[54] APPARATUS FOR DESALINATION AND PURIFICATION OF WATER BY REVERSE OSMOSIS AND ULTRAFILTRATION

[75] Inventors: Hans Timm; Sören Fries, both of Geesthacht; Axel Wenzlaff, Escheburg, all of Fed. Rep. of Germany

[73] Assignee: GKSS-Forschungszentrum Geesthacht·GmbH, Geesthacht-Tesperhude, Fed. Rep. of Germany

[21] Appl. No.: 770,288

[22] PCT Filed: Nov. 30, 1984

[86] PCT No.: PCT/DE84/00255

§ 371 Date: Sep. 26, 1985

§ 102(e) Date: Sep. 26, 1985

[87] PCT Pub. No.: WO85/02552

PCT Pub. Date: Jun. 20, 1985

[30] Foreign Application Priority Data

Dec. 15, 1983 [DE] Fed. Rep. of Germany ....... 3345329

[51] Int. Cl.⁴ ............................................. B02D 13/00
[52] U.S. Cl. .............................. 210/321.1; 210/433.2; 210/488
[58] Field of Search .................... 210/321.1, 346, 347, 210/433.2, 486, 488

[56] References Cited

U.S. PATENT DOCUMENTS 4,228,014 10/1980 Timm et al. ..................... 210/347

Primary Examiner—Ivars Cintins
Attorney, Agent, or Firm—Becker & Becker, Inc.

[57] ABSTRACT

An apparatus for desalination and purification of water by reverse osmosis and ultrafiltration. Such apparatus require seals at the individual modular elements between the untreated water passages and the permeate-withdrawal passages. These seals comprise two sealing rings which are essentially U-shaped, are of similar but inverted shape, and are made of synthetic material having a limited flexibility. Pairs of the sealing rings sealingly abut one another in the central plane of the modular guide plate via respective ones of their arms which extend essentially radially. The second, outward disposed arms sealingly contact an adjacent diaphragm. Disposed on the outer surface of the portion which connects the arms are channels for the withdrawal of the permeate.

8 Claims, 4 Drawing Figures

APPARATUS FOR DESALINATION AND PURIFICATION OF WATER BY REVERSE OSMOSIS AND ULTRAFILTRATION

BACKGROUND OF THE INVENTION

The present invention relates to an apparatus for desalination and purification of water by reverse osmosis and ultrafiltration, which apparatus comprises: plate-like carrier plates and water-guiding plates which are stacked alternately one upon the other and are secured between two end plates; ring-shaped diaphragms which are disposed between the carrier plates and the water-guiding plates and are lined with a filter sheet, with untreated water flowing over the diaphragm side of a given diaphragm, and permeate being withdrawn from the filter side thereof; and sealing arrangements disposed at the periphery of each water-guiding plate between untreated-water passages and permeate-withdrawal passages; beyond the edges of the guide plates, the carrier plates rest upon one another via a widened edge portion, and form, via a gap produced by a reduced thickness of the edge portions of the carrier plates, a permeate-withdrawal passage which communicates with the filter sheets of the diaphragms.

Apparatus of the aforementioned type, as they are disclosed, for example, in the U.S. Pat. No. 4,228,014, which belongs to the Assignee of the present application, must be serviced at regular intervals; in other words, the apparatus must from time to time be provided with new diaphragms, or at least the diaphragms must be freed of deposits, such as algae, sewage, and the like. Since such servicing always involves (at least partial) interruption of operation, it is essential that the apparatus for desalination and purification of water not only be capable of being rapidly disassembled, but also be capable of again being very rapidly reassembled without any alignment and sealing errors. Up to now, this reinstallation has been extremely time consuming and involved a lot of work, since the seals which were used were always multi-part and also were made of different materials. U-shaped edge seals for the water-guiding plates had to be laboriously placed on the toothed rim of the water-guiding plates, and holding rings or water-guiding rings also had to be inserted, on the one hand to hold the annular diaphragms and filter sheets in position, and on the other hand to also support the carrier plate seals on the periphery, so that the latter cannot shift out of position when the untreated-water stream is redirected in the region of the edges of the guide plates.

It is therefore an object of the present invention to provide for apparatus of the initially mentioned type an improved peripheral seal which permits assembly of a modular stack to be carried out considerably more easily and rapidly.

SUMMARY OF THE INVENTION

To realize the aforementioned object, the apparatus of the initially described type is inventively embodied in such a way that the individual sealing arrangements comprise two symmetrical, i.e. of similar but inverted shape, sealing rings which are essentially U-shaped and are made of synthetic material having a limited flexibility; pairs of these sealing rings sealingly abut one another in the central plane of the guide plate, radially outwardly of the periphery of the latter, via respective ones of their arms, which extend essentially radially; outwardly disposed second arms of the sealing rings sealingly contact an adjacent diaphragm, with the outer surface of that portion of the sealing ring which connects the arms being provided with channels for the formation of the permeate withdrawal passage.

The inventively provided U-shaped sealing rings now have no connection whatsoever with the guide plate, which is centrally disposed between the sealing rings and can have untreated water flowing therearound. At the same time, the two outer arms of a given pair of sealing rings abut against two opposed diaphragms, so that the untreated water is reliably separated from the permeate-withdrawal passages. Due to the flexible nature of the synthetic material, the two adjacent arms of a given pair of sealing rings sealingly abut one another in the central plane of the guide plate, and actually beyond the guide plate itself. By using only a single sealing material, and a single shape for the sealing ring, there naturally also results a considerable savings in cost.

Pursuant to specific features of the present invention, the sealing rings may be shaped in such a way that in a state of rest their arms diverge from one another. The outer side of that arm of a given sealing ring which faces the central plane of the guide plate may be provided with a planar surface and with a rounded edge. The outer side of that arm of a given sealing ring which faces the diaphragm may be provided with a sealing rib which extends all the way around. This sealing rib may have a height of less than 1 mm, and may have a rounded-off, triangular cross-section at its tip.

The material of the sealing rings may be resistant to acids and alkalies, and may be a synthetic material which is compatible with foodstuffs. Examples of synthetic materials include polypropylene, polyvinylidene fluoride (PVDF), or the like.

BRIEF DESCRIPTION OF THE DRAWINGS

A preferred exemplary embodiment of the present invention is described subsequently with the aid of the drawings, which show.

DESCRIPTION OF PREFERRED EMBODIMENTS

With the aid of FIGS. 1 and 2, there will first be described an apparatus for desalination and purification of water by reverse osmosis and ultrafiltration as disclosed in applicant's U.S. Pat. No. 4,228,014.

Figure 1:
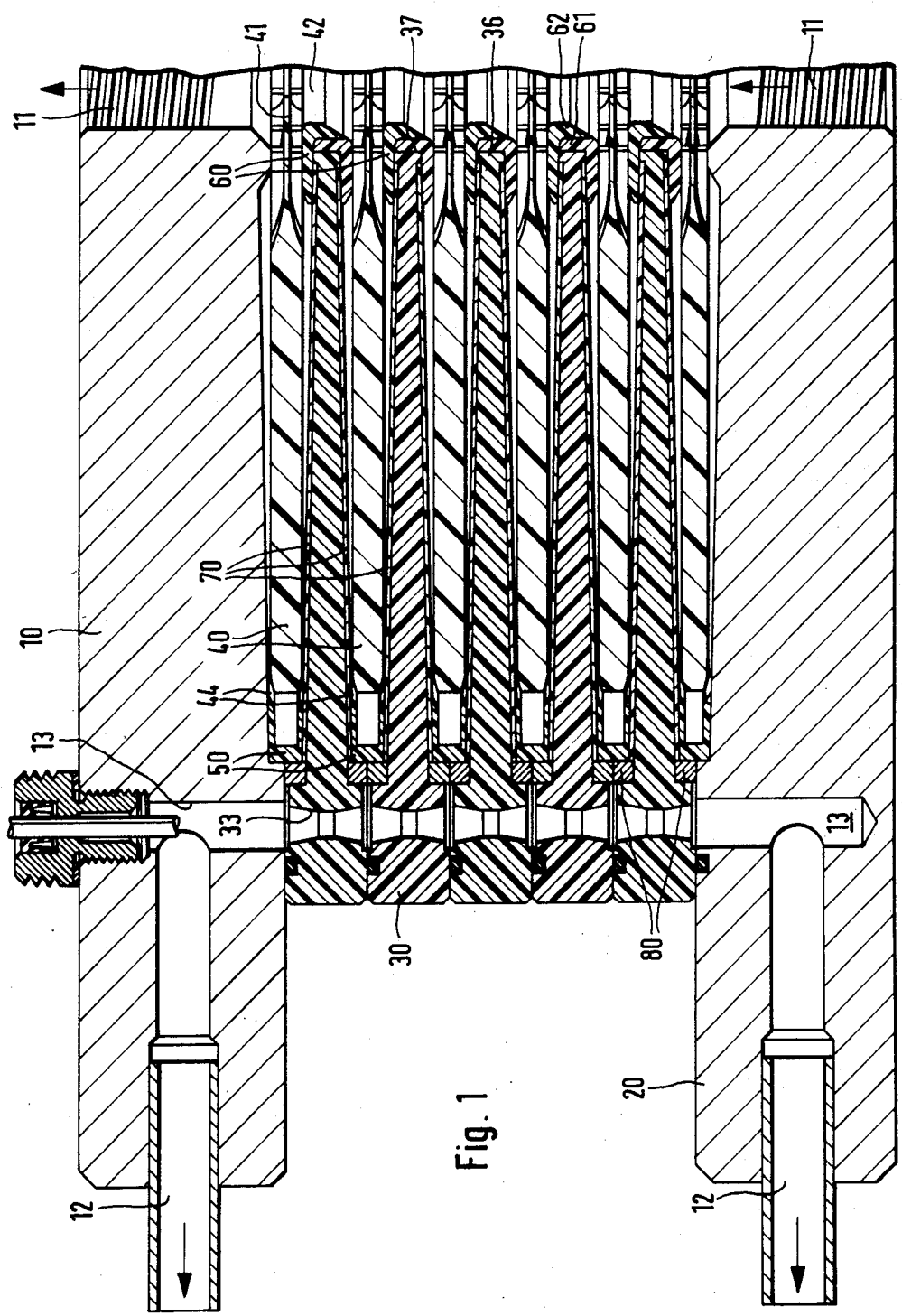
FIG. 1 a radial section through an apparatus for desalination and purification of water pursuant to the state of the art of U.S. Pat. No. 4,228,014, FIG. 2 an enlarged partial cross-section of the apparatus of FIG. 1 through the edges of an end plate and an adjacent carrier plate.
Figure 2:
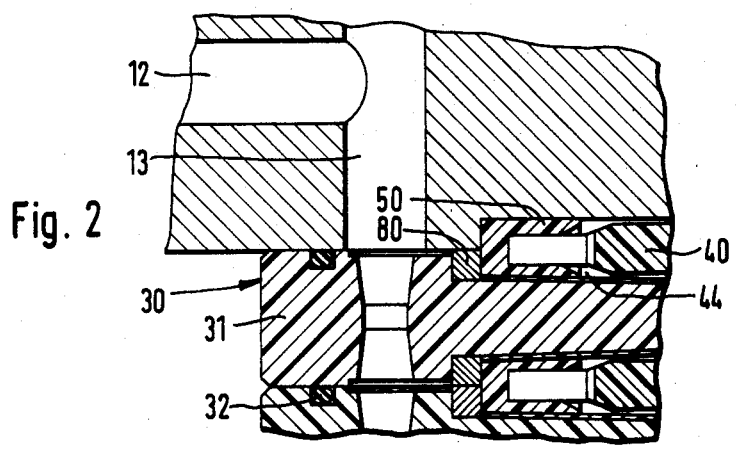

The apparatus of FIG. 1 comprises two end plates 10 and 20 which have relatively thick walls. Disposed between these end plates 10 and 20 are carrier plates 30 and guide plates 40, which are preferably made of synthetic material and are disposed in such a way that they are alternately stacked. Outer seals 50 and inner seals 60 are provided on the guide plates. Disposed on opposite sides of the carrier plates are membranes or diaphragms 70 which are lined with filter sheets. Holding rings 80 serve as radial outer boundaries for the guide plates 40 and their outer seals 50. A plurality of clamping bolts are provided to hold the stack of plates together; these clamping bolts are disposed around the periphery of the stack of plates, and are anchored in the end plates 10 and 20. Provided in the middle of the end plates 10 and 20, which are preferably in the form of circular disks, is a central opening 11 through which the untreated water which is to be desalinated is conveyed; by way of example, in the drawing this occurs in the direction of the indicated arrows. One or more radially directed permeate-withdrawal passages 12 are provided in the end plates 10 and 20. These passages 12 open into an axially directed permeate-withdrawal passage 13 which is disposed radially outwardly of the holding rings 80.

If the apparatus as a whole is disposed in a collecting tank, the passage system 12, 13 can, of course, be eliminated. In this case, the permeate at the outer periphery of the stack of plates can drain off via appropriate outlet gaps. The carrier plates 30 are provided with a planar parallel edge portion 31, the axially directed end faces of which rest sealingly against one another or against the inside surfaces of the plates 10 and 20. To effect sealing, an O-ring 32, which extends all around, is disposed in one of the axially directed end faces of the edge portion 31. Provided in the carrier plates 30 inwardly of this O-ring 32 are axial passages 33 which during assembly are aligned with the axial passage 13 of the end plates. That portion of the carrier plate 30 adjacent to the passage 33 has a somewhat smaller thickness, so that when the carrier plates are stacked, gaps result via which the permeate can reach the axial passage 33 (or a tank which surrounds the stack of plates) in a manner which will subsequently be described in greater detail. The axial thickness of the carrier plate 30 is reduced toward the middle to an annular flange or collar 36, so that the spacing between adjacent carrier plates becomes continuously greater towards the middle in this region. The inclined wall portions of the carrier plate 30 form a support for the circular diaphragms 70, which are lined with a filter sheet. The annular collars 36 are disposed directly next to a central opening 37 of the carrier plates 30. This opening 37 is aligned with the central opening of the end plates 10 and 20. The guide plates 40 are disposed in the disk-shaped space between the individual carrier plates or between the outermost carrier plates and the correspondingly recessed adjacent surfaces of the end plates 10 and 20; over a large annular portion thereof, the guide plates 40 have substantially parallel walls. The guide plates have a thinner central portion 41 which passes through the central openings 11, 37, so that cylindrical bore compartments or sections 42 result in these central openings.

Disposed on the outer edge of the guide plates 40 are notches 44 between which tooth portions remain. These tooth portions carry a U-shaped ring seal 50, which extends over the individual teeth only to such an extent that portions of the notches form passages between the two sides of the guide plates. It should be noted that the outer U-shaped guide plate seals 50 rest against adjacent carrier plates.

Disposed in each of the aforementioned cylindrical compartments of the central opening are two L-shaped sealing rings 61 and 62, by means of which the diaphragms 70 are also held on the carrier plates 30.

The annular disk-like diaphragms 70 extend in the radial direction from the annular collar 36 to the inner periphery of the holding rings 80. The permeate which has passed through the diaphragm 70 can, below the U-shaped seal 50, reach the step surface of the carrier plate 30. So that from this step surface the permeate can now reach the axial passages 33 or 13, and hence the permeate-withdrawal passages 12, the holding rings 80 are provided at their radially outwardly disposed peripheral surface with fine channels, which are preferably produced by knurling.

From the above description of the heretofore known apparatus for desalination and purification of water, it can be seen that the untreated water which enters at the bottom end of the central opening 11 can flow radially through the stack of plates in a zig-zag fashion. The untreated water initially flows from a central portion 41 of the guide plate radially outwardly along the latter, then flows to the opposite side of the guide plate at the notches 44, and then again flows radially toward the middle to reach the next cylindrical compartment 42. At the end of the filter process, the nondesalinated or nonpurified, and hence concentrated, residual water is again discharged at the upper end of the central opening 11. The permeate collects below the diaphragms in the filter sheets, and passes around the holding rings 80 to the carrier plate gaps and to the permeate discharge 13-12.

From the foregoing description it was clear that the U-shaped seals 50, which are placed upon the teeth at the periphery of the guide plates, have the task of pressing against the diaphragms 70 and the filter sheets, and of holding them in their position. Assembly is made more difficult by the fact that that edge of the guide plate which is provided with the U-shaped seal 50 must be placed exactly in the central opening of the thin holding ring 80. In order to get by without this complicated assembly, and in order to reduce the cost of the entire sealing arrangement, it is proposed pursuant to the present invention to replace the previously described seals 50 with the sealing rings 100 which are illustrated in FIGS. 3 and 4; these sealing rings 100 furthermore undertake the function of the holding rings 80.

Figure 3:
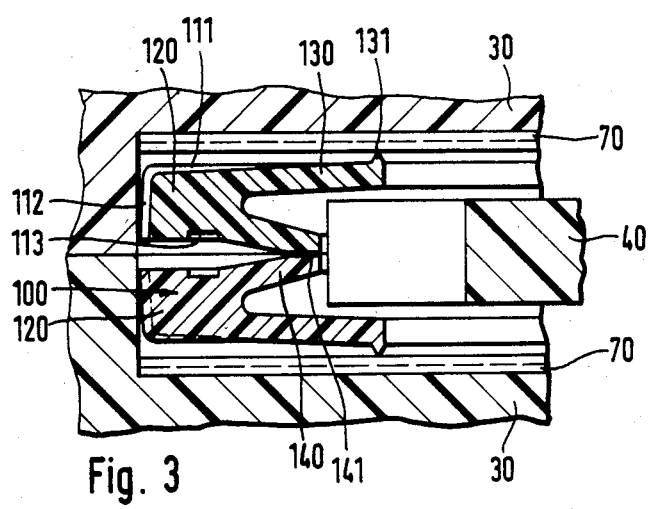
FIG. 3 an illustration similar to that of FIG. 2 showing an inventive sealing arrangement which replaces the sealing arrangement of FIGS. 1 and 2.
Figure 4:
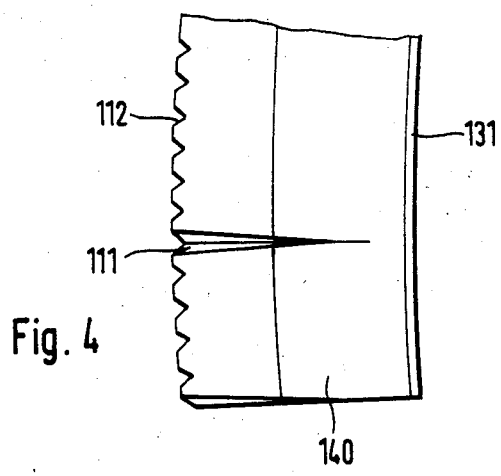
FIG. 4 an even greater enlargement of an axial partial view of an inventive sealing ring.

As shown in FIGS. 3 and 4, U-shaped sealing rings 100 are now used. At each location, two of these sealing rings 100 work together as a pair and surround a guide plate 40 which is disposed centrally between the sealing rings, but is not contacted by them. Each sealing ring 100 has a U-shaped cross-sectional profile. The outer diameter of each sealing ring 100 is such that the sealing rings can be placed into the recess of the carrier plates 30 similar to the previously used holding rings 80. During assembly, an annular diaphragm 70, which is lined with a filter sheet, is first placed into the recess of the carrier plate 30 exactly as was previously done; the diaphragm can then be held in place by inserting the sealing ring into the recess of the plate 30. Due to the elasticity of the material, a sealing ring 100 is held securely in its recess. The long arm 130 of the sealing ring is directed outwardly with slight prestress; the nose 131 of the long arm 130 extends over the periphery of the latter and contacts the surface of the diaphragm 70, so that the untreated water which flows around the guide plate 40 cannot reach the permeate-withdrawal passage. From the region below the diaphragm 70, the permeate which passes through this diaphragm can enter the space disposed in the recess of the plate 30 radially outwardly of the sealing nose 131. As shown in FIG. 4, provided at this location are radial, slightly diverging channels 111 which make it possible for the permeate to flow to the outer periphery of the sealing ring 100, where further channels 112 are provided which make it possible for the permeate to flow through the gap between two adjacent carrier plates 30.

When a carrier plate 30 is lined with a filter sheet and diaphragm 70, and is provided with a sealing ring 100, it is possible, as shown in FIG. 3, to freely place the guide plate 40 in the central portion of the sealing ring 100 inwardly of the short arm 140 thereof. When subsequently a further carrier plate 30 prepared in the same manner is inserted, the two similarly slightly prestressed outer ends of the short sealing ring arm 140 abut one another (at 141) and thus assure a complete sealing-off of the untreated water passage outwardly of the guide plate 40. Small recesses 113 which extend over the periphery are provided at the base or connecting portion 120 of the sealing rings; these recesses give the sealing rings a greater elasticity. The intermediate space, which is disposed between two adjacent sealing rings 100 and extends over the periphery, serves the same purpose and also serves to improve the flow or discharge of permeate.

The material of the sealing ring is preferably synthetic material which is compatible to, i.e. safe for use with, foodstuffs, with examples of such material being polypropylene, polyvinylidene fluoride (PVDF), and the like.

What we claim is:

1. An apparatus for desalination and purification of water by reverse osmosis and ultrafiltration, comprising: plate-like carrier plates and water-guiding plates which are stacked alternately one upon the other, and are secured between two end plates, with each of said guide plates having a central plane; ring-shaped diaphragms which are disposed between said carrier plates and said guide plates and are lined with respective filter sheets, with untreated water flowing over the diaphragm side of a given diaphragm, and permeate being withdrawn from the filter side thereof; and a respective sealing arrangement disposed at the periphery of each guide plate between untreated-water passages and permeatewithdrawal passages; beyond the edges of said guide plates, said carrier plates rest upon one another via a widened edge portion and form, via a gap produced by a reduced thickness of the edge portions of said carrier plates, a permeate-withdrawal passage which communicates with said filter sheets of said diaphragms;

the improvement wherein individual ones of said sealing arrangements comprise a pair of symmetrical sealing rings which are essentially U-shaped and are made of synthetic material having a limited flexibility; each of said sealing rings has a first essentially radially extending arm directly toward said guide plate, a second essentially radially extending arm directed toward a respective one of said diaphragms, and a connecting portion, remote from said guide plate, which interconnects said first and second arms; for a given pair of sealing rings, said first arms are remote from one another, and said second arms sealingly abut one another in said central plane of a given guide plate radially outwardly of the periphery of the latter, with said first arms sealingly contacting an adjacent diaphragm; the outer surface of said connecting portions, remote from said guide plates, is provided with channel means to form part of said permeate-withdrawal passages.

2. An apparatus according to claim 1, in which each of said sealing rings is formed in such a way that in a state of rest, said first and second arms thereof diverge from one another.

3. A apparatus according to claim 2, in which that surface of each of said first arms of said sealing rings remote from said second arm thereof is planar and has a rounded-off edge.

4. An apparatus according to claim 3, in which that surface of each of said second arms of said sealing rings which faces said diaphragm is provided with a sealing rib which extends all the way around.

5. An apparatus according to claim 4, in which said sealing rib extends less than 1 mm from the surface of said second arm, and has a triangular cross-section, the tip of which is rounded off.

6. An apparatus according to claim 5, in which the material of said sealing rings is resistant to acids and alkalies.

7. An apparatus according to claim 6, in which the material of said sealing rings is synthetic material which is safe for use with foodstuffs.

8. An apparatus according to claim 7, in which said synthetic material is selected from the group consisting of polypropylene and polyvinylidene fluoride (PVDF).

* * * * *